United States Patent [19]

Neu et al.

[11] Patent Number: 5,163,412
[45] Date of Patent: Nov. 17, 1992

[54] POLLUTION CONTROL SYSTEM FOR OLDER VEHICLES

[75] Inventors: Steven W. Neu; Bruce A. Bergman, both of San Diego, Calif.

[73] Assignee: Neutronics Enterprises, Inc., San Diego, Calif.

[21] Appl. No.: 789,584

[22] Filed: Nov. 8, 1991

[51] Int. Cl.$^5$ .......................... F02D 41/14; F01N 3/20
[52] U.S. Cl. ........................................ 123/700; 60/285
[58] Field of Search ...................... 123/698, 699, 700; 60/274, 276, 285

[56] References Cited

U.S. PATENT DOCUMENTS

| | | | |
|---|---|---|---|
| 4,140,093 | 2/1979 | Hattori et al. | 123/700 X |
| 4,345,737 | 8/1982 | Kawai et al. | 123/700 X |
| 4,593,663 | 6/1986 | Atago et al. | 123/700 X |
| 4,690,121 | 9/1987 | Kawanabe et al. | 123/700 X |
| 4,705,011 | 11/1987 | Hibino et al. | 123/700 |
| 4,715,352 | 12/1987 | Kawanabe et al. | 123/700 |
| 4,763,265 | 8/1988 | Kawanabe et al. | 123/700 X |

Primary Examiner—Willis R. Wolfe
Attorney, Agent, or Firm—Brown, Martin, Haller & McClain

[57] ABSTRACT

A pollution or emission control system for retrofitting on older vehicle engines includes a catalytic converter with an in-built oxygen sensor for mounting in the exhaust line, and a supplemental air input line containing a control valve for connection to the engine intake manifold to control the amount of air supplied to the engine. A computer monitors the oxygen sensor output and the engine speed, and controls opening and closing of the control valve according to the detected conditions. The computer also controls the speed at which the valve is opened or closed dependent on the engine speed and optionally the engine temperature, so that the valve can be closed faster at slower engine speeds and opened faster at higher engine speed. The computer is additionally capable of producing diagnostic telemetry, both digital and analog, to assist installation of the invention and test for proper operation once installed.

16 Claims, 9 Drawing Sheets

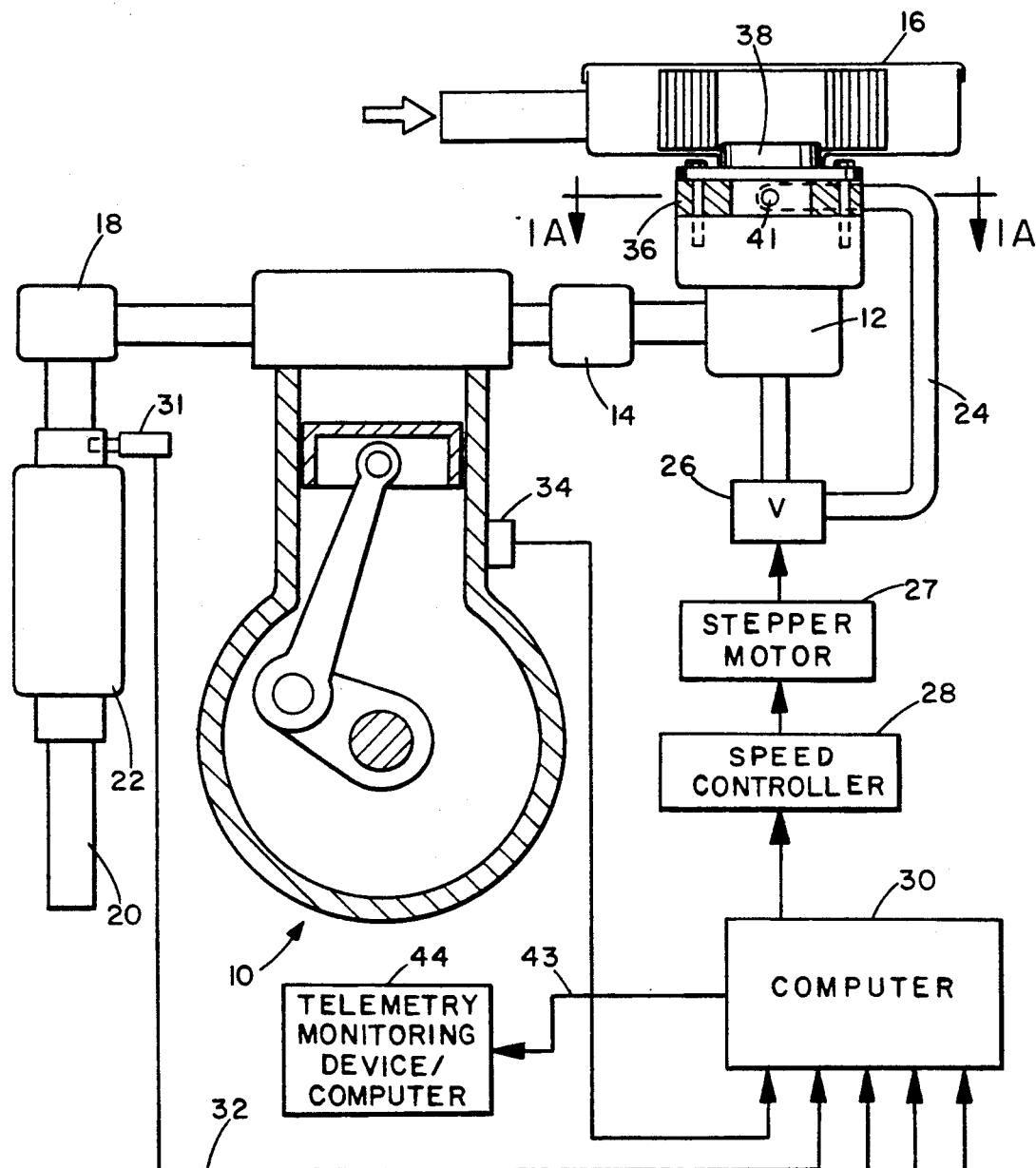
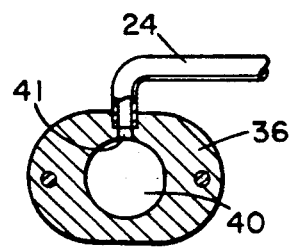
FIG. 1
FIG. 1A

POLLUTION CONTROL SYSTEM FOR OLDER VEHICLES

BACKGROUND OF THE INVENTION

The present invention relates generally to a pollution control system for reducing exhaust emissions from internal combustion engines for driving cars and other vehicles.

Since around 1975, most passenger cars and light trucks in the United States have been provided with catalytic converters in the exhaust system for reducing emission of pollutants such as hydrocarbons, carbon monoxide and nitrogen oxides which are commonly present in the exhaust gases and which cause atmospheric pollution, or smog. Cars older than this typically have no pollution control system, and it would generally be too expensive to retrofit such vehicles in view of their limited future lifetime. From 1975 to 1979, most emission control systems in the United States were oxidation catalysts, which promoted the oxidation of hydrocarbons and carbon monoxide into carbon dioxide and water vapor. In such vehicles, sufficient oxygen must be provided to the catalyst to promote the required oxidation reactions. Additionally, such catalysts do not reduce emission of nitrogen oxide ($NO_x$), pollutants.

Pollution control systems on vehicles have been improved since the early 80's with the introduction of the three way catalyst system which can reduce emissions of all three pollutants—HC, CO, and NOx. For maximum efficiency of such systems, the engine must be operated in a very narrow air/fuel ratio range around a stoichiometric value, typically 14.7:1. Thus, modern vehicle engines are provided with a relatively complex feedback control system which senses when the vehicle is operating either too rich or too lean compared to the stoichiometric value and adjusts the amount of air or fuel admitted to the engine accordingly. In U.S. Pat. No. 4,561,394 of Kishida et al., for example, a secondary air supply system is provided to supply air downstream of the throttle valve according to the detected engine conditions. A basic feedback control system of this type typically includes an oxygen sensor for measuring the amount of oxygen present in the exhaust, a means of controlling the air/fuel ratio, and a computer to process sensor information and control the air/fuel ratio accordingly. Such systems also often include engine temperature and engine speed sensors to change the operating conditions under certain extreme conditions, for example during warm up, where operation at the stoichiometric ratio would result in poor performance. For example, under cold start conditions, the air/fuel ratio may be controlled to be on the rich side for smoother operation.

Because of the improved pollution control systems on vehicles dated after 1981, emissions of pollutants from such vehicles are significantly less than from older vehicles. A pre-1971 vehicle having no emission control system is estimated to emit pollutants in concentrations as much as 25 times higher than a new vehicle. Thus, in spite of the fact that there are much fewer old vehicles on the road than newer models, the older vehicles are estimated to make a disproportionate contribution to air pollution. In fact, although pre-1972 vehicles constitute only about 4% of the vehicle population in California, for example, they are estimated to account for about 15% of all pollutant emissions from mobile sources. Vehicles with older style catalytic converters dated between 1975 to 1980 also produce more pollutant emissions than more modern vehicles with three way catalytic converters and feedback control systems.

SUMMARY OF THE INVENTION

It is an object of the present invention to provide a new and improved exhaust emission control system for older vehicles.

According to the present invention, an exhaust emission control system for retro-fitting on existing vehicle engines is provided, which comprises a catalytic converter for connection in the engine exhaust system, an air-fuel ratio detector in the exhaust system for detecting the air-fuel ratio in the exhaust and producing an output signal proportional to the air-fuel ratio, an air supply inlet for connection to the engine intake downstream of the engine throttle valve to supply secondary air to the engine, a control valve in the air supply inlet for controlling the amount of secondary air supplied to the engine, the valve being moveable between fully closed and successive partially open positions, a valve driver for moving the valve between its open and closed positions, and a controller connected to the air-fuel ratio detector for determining the air-fuel ratio from the output of the air-fuel ratio detector, determining the engine speed, and controlling operation of the valve driver according to the detected engine speed and air-fuel ratio.

The controller is designed to control the speed of valve opening or closing in accordance with tables of stored open and close rates as a function of engine speed. The controller also controls how far the valve is opened or closed dependent on the detected engine speed, to secure smooth engine operation at all speeds. Thus, for each engine speed, a valve target position and open and close rate is determined from stored tables. If the detected air-fuel ratio indicates the mixture is too lean, the valve will be closed towards the target position at a rate dependent on the current engine speed, with the valve being closed at a faster rate at lower engine speeds. If the detected air-fuel ratio indicates the mixture is too rich, the valve will be opened towards the determined target position at a rate which is also dependent on the engine speed.

If the engine is equipped with a temperature sensor, the output of the sensor is also connected to the controller and the stored tables of values will also include temperature ranges at which the valve is opened or closed at different rates. Additionally, whether or not the system includes a temperature sensor, the controller keeps the valve in a predetermined position during cold start-up of the engine, until a predetermined temperature is reached where a temperature sensor is used, or for a predetermined time interval after start-up where no temperature sensor is present.

This system can be used to reduce pollutant emissions either on vehicles which were not originally equipped with catalytic converters or on vehicles equipped with relatively old and less efficient catalytic converters. Preferably, the catalytic converter is a dual bed catalyst with a built-in oxygen sensor, and may be simply bolted into the exhaust line, where no original catalyst is present. Where an old oxidation catalyst is present, it is simply removed and the new catalyst with oxygen sensor is bolted on in its place. The supplemental air inlet with built-in control valve is installed at the engine inlet, and the controller or computer control module is hooked up to the oxygen sensor, any existing temperature sensor, and engine speed sensor present in all vehicle engines. Tables of optimum open and close rates for different types of engines are provided, from one to eight cylinders, and the installer simply selects which type of engine via a selector switch provided on the control module.

The computer is preferably also programmed to provide selected analog and digital telemetry or diagnostic output signals which can be monitored by hooking the computer to suitable output devices. This assists in initial installation of the system as well as in subsequent diagnostic testing. The diagnostic outputs provided include engine temperature and speed, current valve position, target valve position, speed bands, valve open and close rates, and current program status.

Installation of this system on vehicles in the 1975 to 1980 model year range in place of the old oxidation catalyst will reduce emissions of HC and CO significantly, and will also reduce emissions of NOx. This system may also be used to replace emission control systems of newer vehicles when those vehicles age to a point where the original system is no longer operating efficiently.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 is a schematic view of an engine with an exhaust emission control system according to a preferred embodiment of the present invention;

FIG. 1A is a section on the lines 1A—1A of FIG. 1;

DESCRIPTION OF THE PREFERRED EMBODIMENT

Figure 2:
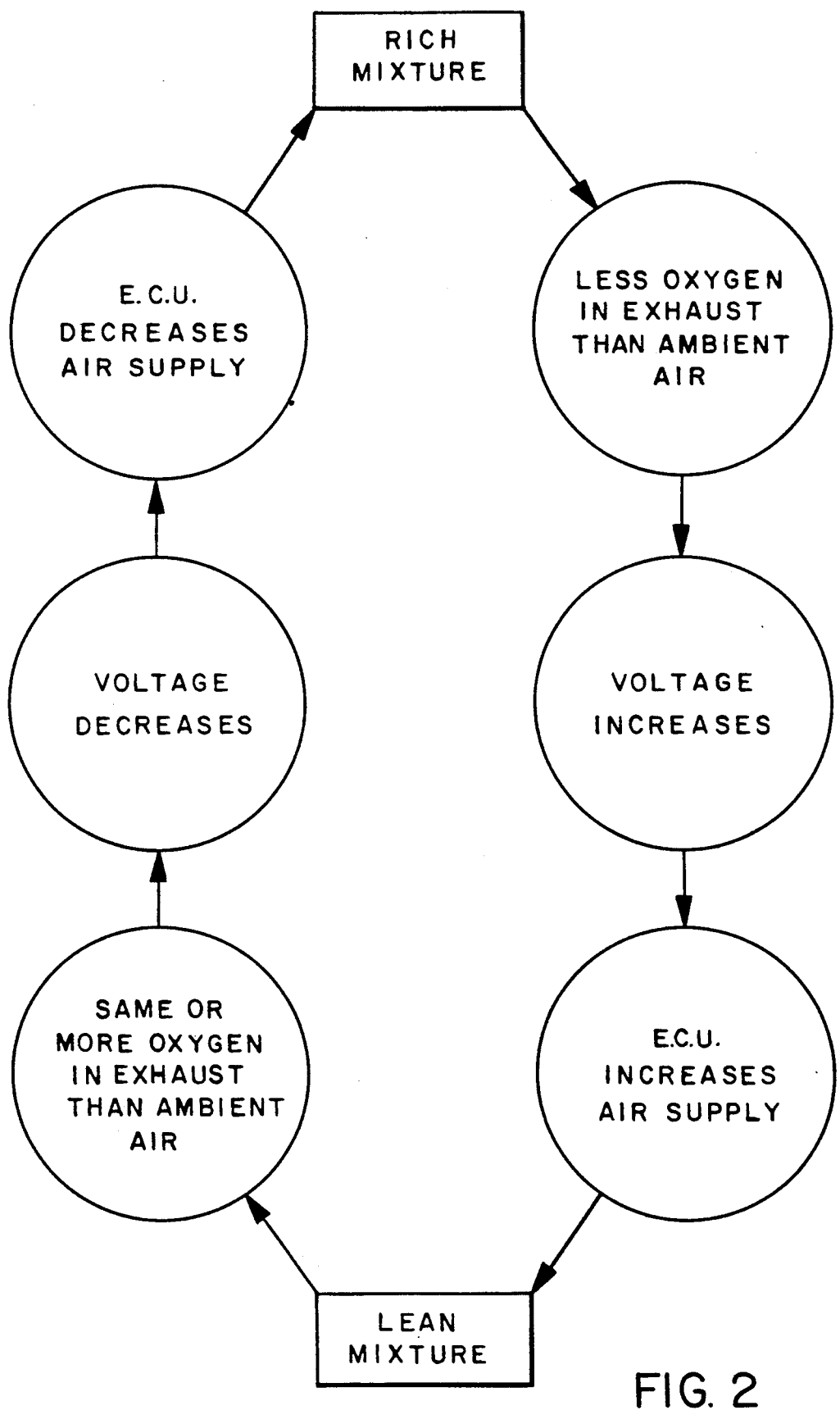
FIG. 2 is a schematic illustration of the closed loop operation of the system.

FIG. 1 illustrates an exhaust emissions control system according to a preferred embodiment of the present invention installed in an internal combustion engine 10. The engine 10 is supplied with a mixture of air and fuel from carburetor 12 through intake manifold 14. A standard air filter 16 is mounted upstream of the carburetor 12. Exhaust gases are emitted through exhaust manifold 18 to exhaust pipe 20. The exhaust emission control system is installed in the engine 10 as generally illustrated in FIG. 1.

The emission control system basically comprises a catalytic converter 22 for removing pollutants such as carbon monoxide, hydrocarbons, and nitrogen oxides from the exhaust gases, and a supplemental air inlet pipeline 24 for supplying supplemental air to the engine downstream of the throttle, with a control valve 26 in the inlet pipeline 24 for controlling the amount of supplemental air supplied to the engine. The valve 26 is moved between its open and closed positions in a series of steps via stepper motor 27, as is conventional in most emission control systems. However, the speed of motor 27, and thus the rate of valve opening or closing, is controlled by computer 30 which controls a suitable motor speed controller 28, which may be a speed control chip built into computer 30. Computer 30 controls the adjustment of the speed controller 28 to set the valve opening or closing rate, and controls operation of motor 27 to open or close the valve 26. Optionally, a pair of potentiometers may be provided to allow the user to manually select the valve opening and closing rates, primarily for diagnostic purposes.

An oxygen sensor 31 is provided in catalytic converter 22 and produces an output 32 connected to the computer 27. The computer is also connected to the existing, standard engine RPM pickup or speed sensor 33 for detecting engine speed, and to the engine temperature sensor 34 if present. If the engine has no temperature sensor, the temperature input line is preferably tied to ground, so that the engine temperature will be detected as hot at all times. The computer has a selector switch 35 allowing the installer or user to select the type of engine on which the system is being installed, from one to eight cylinder engines (motor cycles to large automobiles), so that the same basic system can be installed on any type of vehicle engine, as will be explained in more detail below.

The catalytic converter 22 is preferably a dual bed catalytic converter including a NOx reduction catalyst followed by an oxidation catalyst. The converter 22 is installed by bolting into the exhaust line in place of an existing, older catalyst. Where the engine has no existing catalyst, the converter is simply bolted into the exhaust line.

The air inlet pipeline 24 may be installed via an adaptor plate 36 as illustrated in FIGS. 1 and 1A, which allows air being drawn in via the air filter to bypass the engine throttle valve via supplemental inlet line 24. Adapter plate 36 may be bolted between the carburetor and air filter base 38, as illustrated in FIG. 1, and has a central orifice 40 communicating with the incoming air through the air filter and connected via radial bypass outlet 41 to the bypassing air inlet pipeline 24, as illustrated in FIG. 1A. Pipeline 24 is connected through valve 26 to the engine intake manifold.

A suitable power supply 42 is provided for operating the system. The air inlet valve 26 is operated by stepper motor 27, which is of a standard type used in automobile emissions control systems. The computer module 30, which may be a KAT 200 computer or equivalent, may be installed on the vehicle fire wall before hooking up to the various sensors.

The computer also has a standard serial output port 43 which can optionally be hooked up to a telemetry output monitor 44 such as a second computer, to provide indication of the status of various system variables for initial set up and diagnostic purposes, as will be explained in more detail below in connection with FIGS. 4A to 4C.

Computer 30 is programmed to control opening and closing of valve 26 according to the various sensor inputs and stored tables of data, as illustrated in FIGS.

Figure 3A:
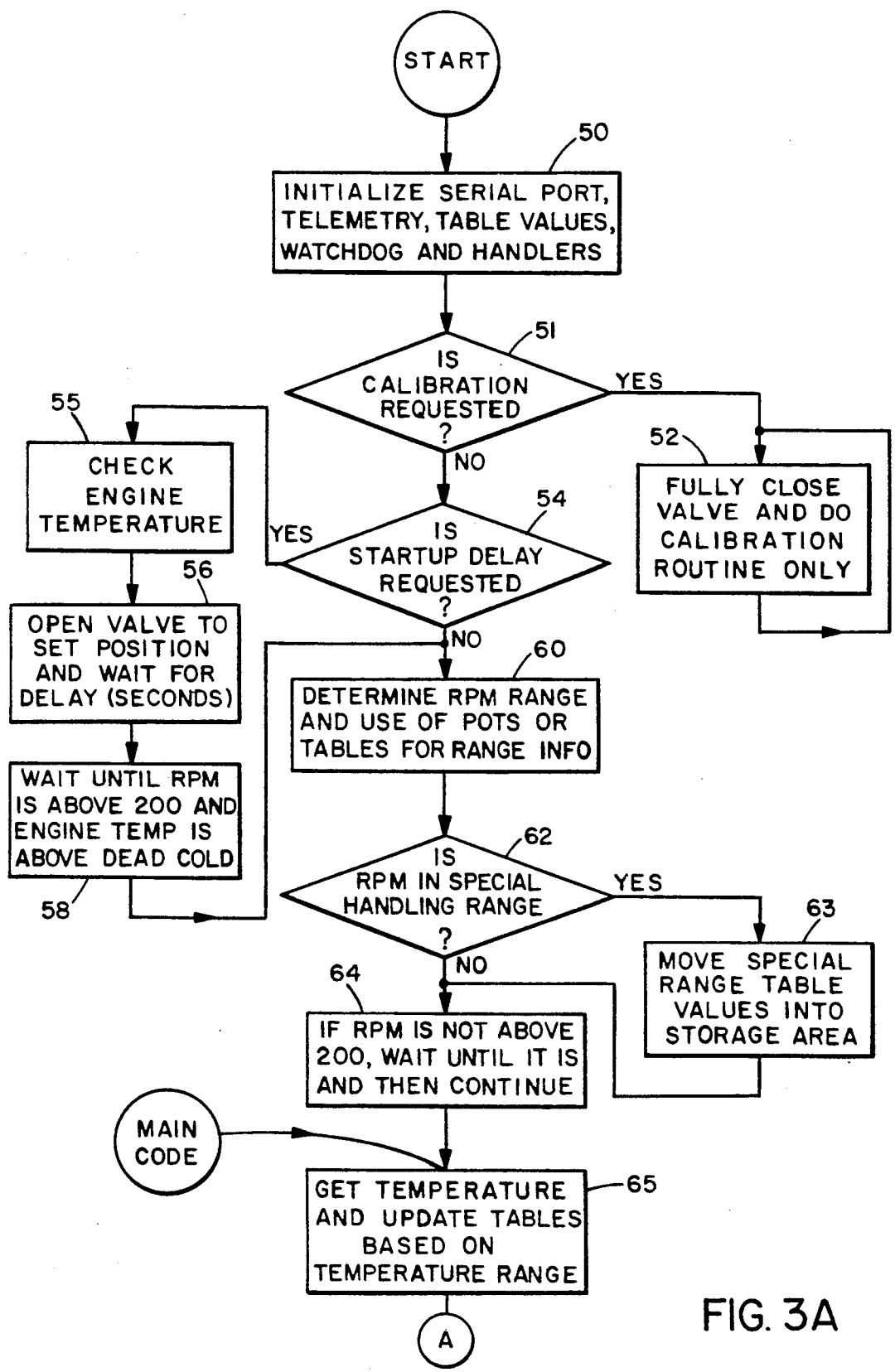
FIGS. 3A and 3B are flow charts illustrating operation of the system of FIG. 1.
Figure 3B:
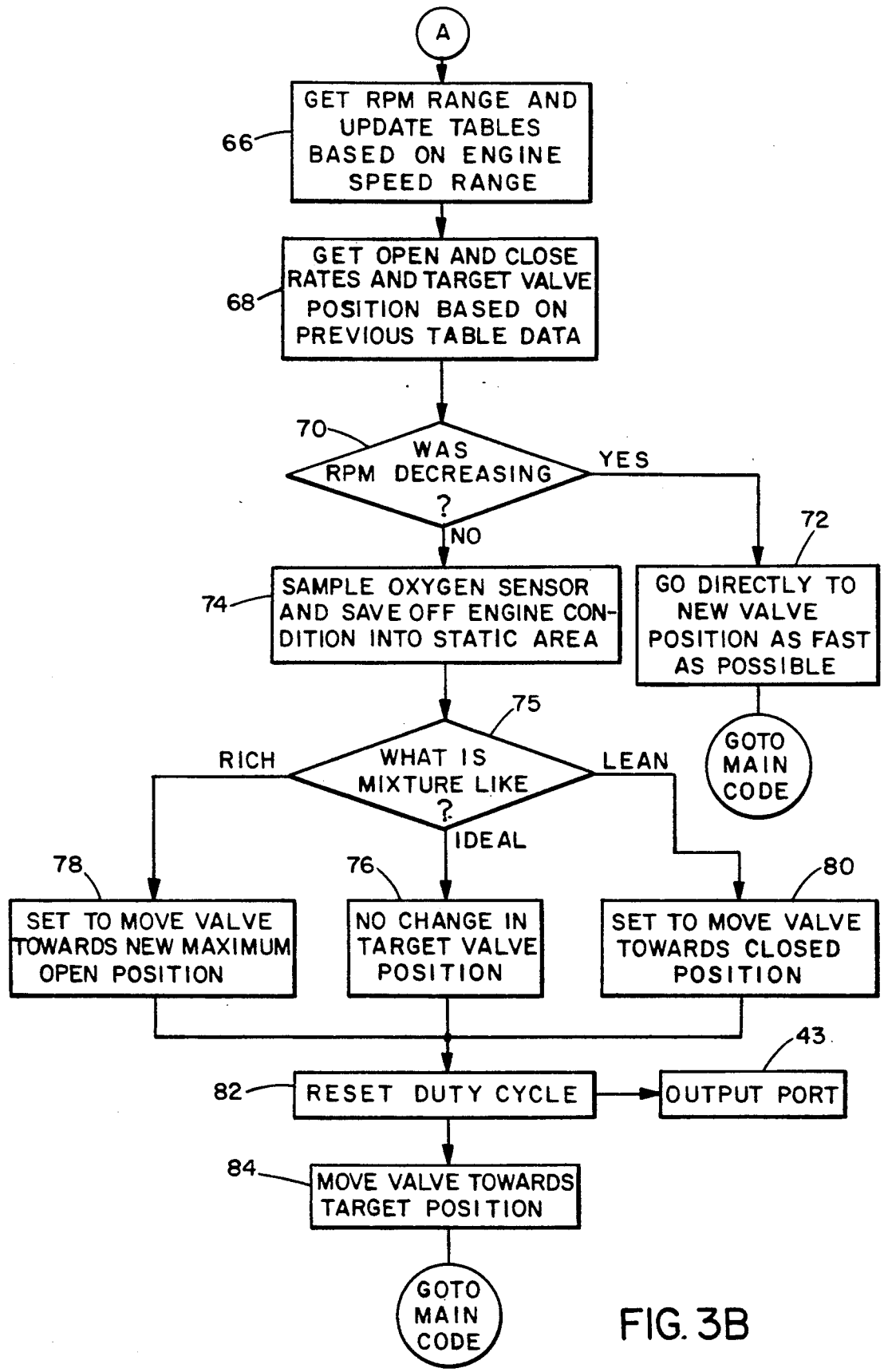

2, 3 and 5-8. Three-way catalytic converters used on vehicles operate best at a stoichiometric air-fuel ratio, normally 14.7:1. If the detected air-fuel ratio is richer or leaner than this, the computer controls the stepper motor operating valve 26 in a closed loop operation to open or close the valve to adjust the amount of supplemental air supplied to the engine and thus control the air-fuel ratio to be at or close to the stoichiometric value, as generally illustrated in FIG. 2. FIGS. 3A and 3B are flow diagrams illustrating the steps performed by the computer according to stored program instructions in order to control operation of valve 26.

The program includes various start-up or initialization procedures 50 and an optional calibration routine 51, 52 which allows the engine to be run for maintenance, for example, without entering the valve opening and closing loop. The engine or power to the computer must be turned off to exit this routine. An optional start-up delay may be selected in step 54. This delay is designed to ensure that the engine has reached stable operating conditions before the program goes into its closed loop operation, avoiding the risk of "hunting" and consequent reduction in performance of the engine. Where the engine has a temperature sensor, the valve is opened to a set position for a predetermined time dependent on the detected temperature (steps 55, 56), the time delay being shorter when the engine is hot than when it is cold, with the delay range extending from 15 to 30 seconds. If the engine is very cold, i.e. below 50° C., the valve is closed until the temperature reaches 50° C. and the engine speed is above a certain value, e.g. 200 R.P.M. (step 58) before returning to the main program. Where there is no temperature sensor for input to the computer, the system simply waits for a set period of time, of the order of 15 to 30 seconds after start-up, before proceeding.

At this point the system determines the RPM ranges for the particular engine (step 60). The user selects a particular RPM range dependent on the type of engine when the system is installed, according to the number of cylinders, via selector switch 35 (FIG. 1). The look-up tables used below will be dependent on the position of selector switch 35.

Before proceeding on to closed loop operation, the system then determines whether the speed is in a special handling range (step 62). This is because some engines will have non-linear responses if the mixture is very lean or very rich at very low engine speeds, for example below 800 RPM. In this special range, the valve is opened and closed at a much faster rate, according to special rate values stored in the tables, and these values are adopted in step 63 under appropriate operating conditions.

The program is also designed to wait until the engine speed is above 200 RPM (step 64) before proceeding into closed loop operation, regardless of whether start-up delay is requested. This is to avoid the risk of the engine running roughly or potentially stalling if the mixture is too lean at low speeds. The valve is held closed until this point.

Look-up tables are stored in the computer memory which provide optimum valve opening and closing rates and maximum open positions for various engine speeds and temperatures, as generally illustrated in FIGS. 5 to 8, and the computer will look up these values dependent on the detected temperature (step 65) and engine RPM (step 66) to get the optimum valve open and close rates and target position (step 68). These tables were derived experimentally for a four cylinder engine and correction factors were used to produce corresponding tables for other types of engines from one to eight cylinders, as will be explained in more detail below.

Figure 5:
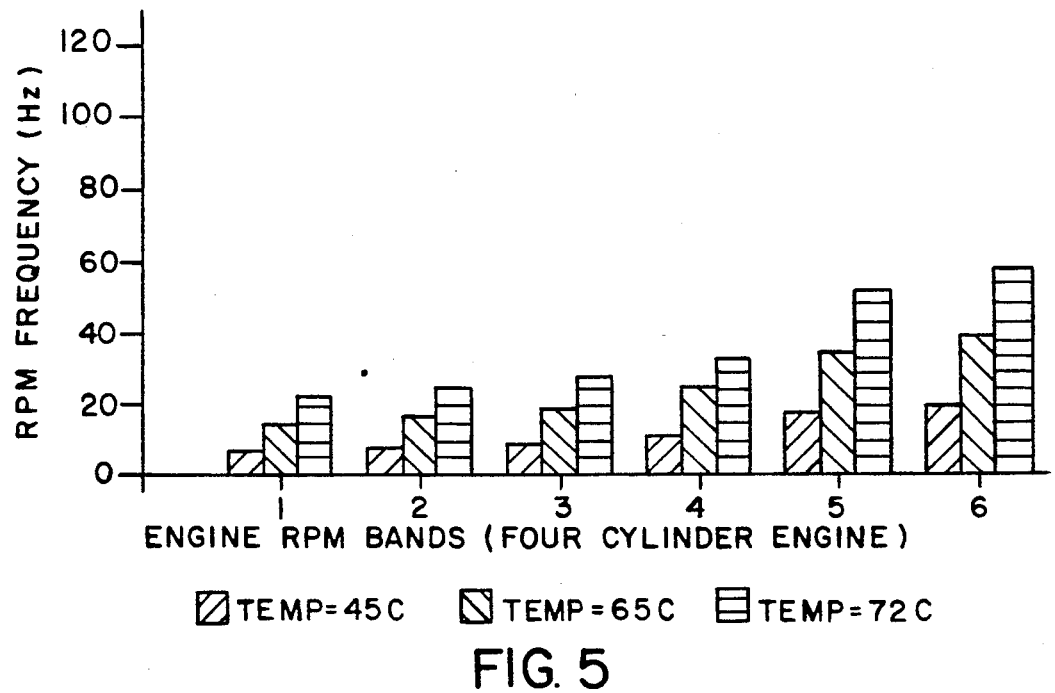
FIG. 5 is a graphical representation of six engine RPM bands stored in the system controller for controlling operation of the system according to engine RPM.

In the preferred embodiment illustrated in the drawings, six engine RPM bands are used (as illustrated in FIG. 5), ranging from idle speed in band 1 up to high speed in band 6. The engine RPM bands in FIG. 5 are for a typical four cylinder passenger car, and these bands will be different for engines having different numbers of cylinders, with the computer having stored information on RPM ranges for bands 1 to 6 for engines having from one to eight cylinders, and selecting the RPM ranges to be used for bands 1 to 6 in FIGS. 6 to 8 according to the information entered via selector switch 35. For engines having a different number of cylinders, a correction factor was used to convert the four cylinder engine RPM bands to RPM values corresponding to engines having a greater or lesser number of cylinders. For example, an eight cylinder engine will have twice the number of tachometer pulses as a four cylinder engine, and for the same RPM will have double the frequency in Hertz, while a two cylinder engine will have half the frequency. Thus, the "idle" band, or band 1, for an engine having a different number of cylinders is derived by multiplying the four cylinder band frequency by an appropriate correction factor, dependent on the number of cylinders. Speed bands 1 to 6 are stored in the computer for the different types of engines from one to eight cylinders, and the user selects the appropriate set of data for the particular vehicle on which the system is installed.

Figure 6:
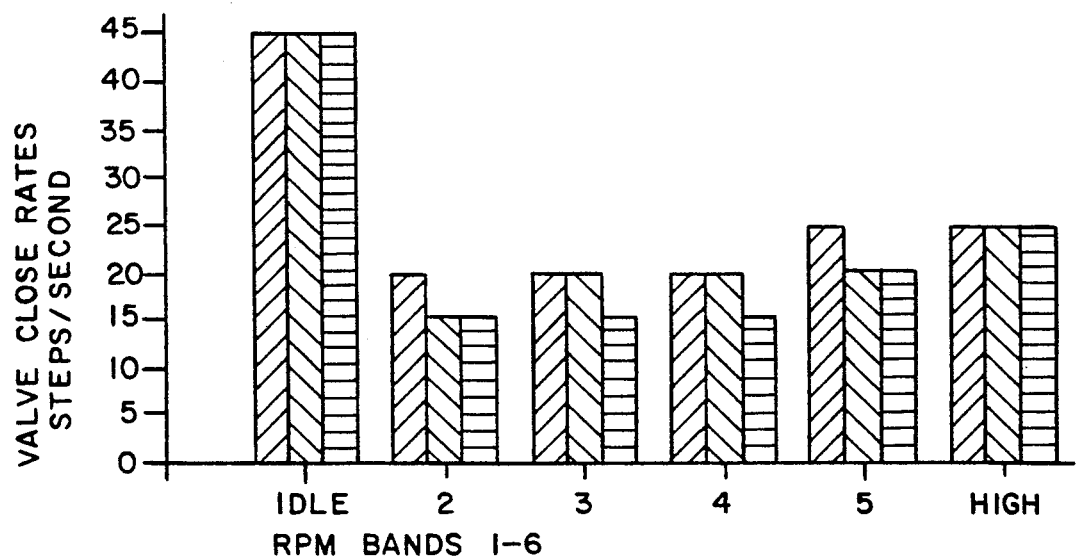
FIG. 6 is a graphical representation of valve closure rates used by the system at different engine speeds.

FIG. 6 illustrates the optimum valve closing rate in steps per second for each of the engine speed bands, with the valve closing rate being much faster when the engine is idling than at high speeds, to avoid rough running of the engine at low speeds if the mixture is too lean. These set rates will be the same for all different types of engines, but the speed bands 1 to 6 at which the particular rate is used will be different dependent on the engine type, as explained above. Band 1 for a two cylinder vehicle will be at a higher RPM than for a four cylinder vehicle, and at a lower RPM for an eight cylinder vehicle.

Figure 7:
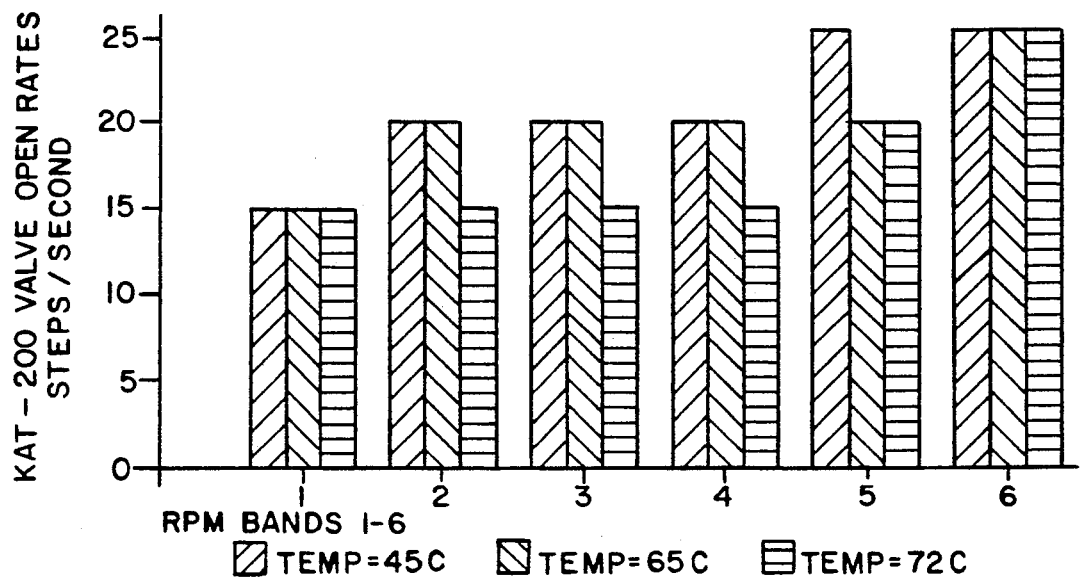
FIG. 7 is a graphical representation of valve opening rates used by the system at different engine speeds.
Figure 8:
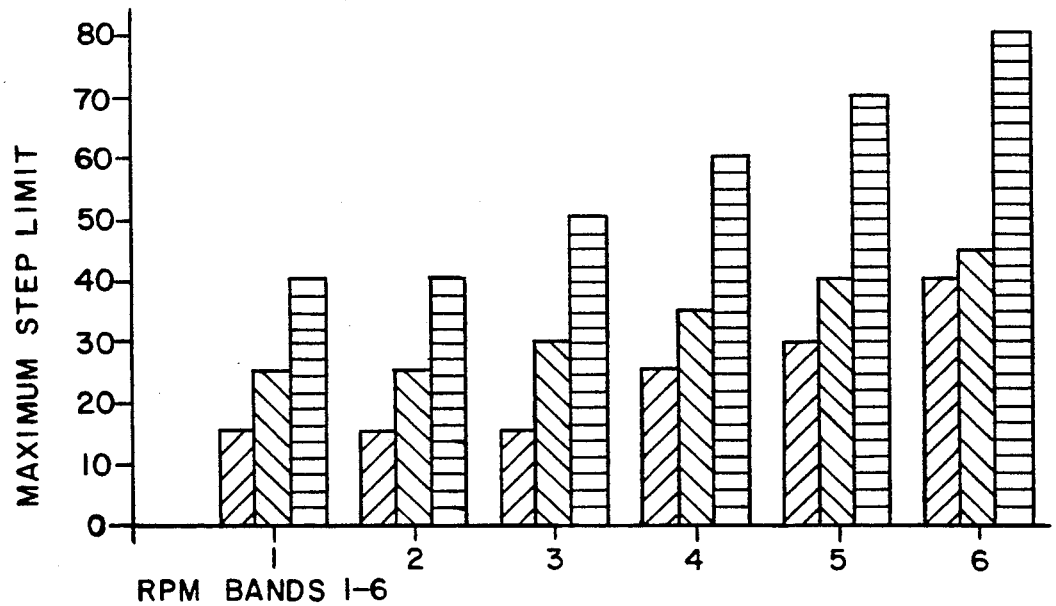
FIG. 8 is a graphical representation of different maximum valve opening steps used by the system in the different engine speed ranges.

FIG. 7 illustrates the experimentally derived optimum valve opening rate in steps per second for each of the engine speed bands, the valve generally opening faster at higher speeds. For each speed band in both FIGS. 6 and 7, three different temperature bands are provided, and the valve opening and closing rates will also be dependent on the detected temperature in each speed range. When the engine has no temperature sensor, the system will operate as if the engine temperature is high at all times (i.e. greater than 72° C.). For each particular engine speed and temperature, values of maximum valve opening (target valve position) are also stored, corresponding to the values tabulated in FIG. 8 in one preferred embodiment of the invention. FIG. 8 represents the maximum number of valve opening steps for each of the temperature and engine speed bands, where the maximum possible number of steps to move the valve to its fully open position is 225. It can be seen that the maximum valve opening is greater at higher engine speeds and temperatures, in general. The tabulated valves were also derived experimentally for a four-cylinder engine for bands 1 to 6, and will be at different engine speeds for engines having a different number of cylinders, as explained above.

It can be seen from FIGS. 5, 6 and 7 that the valve will be closed faster at lower speeds and will be opened faster at higher speeds as well as lower temperatures. Also, the maximum valve opening will be increased at higher engine operating temperatures, i.e., under more stable operating conditions, supplying more air more quickly if the engine is relatively hot than if it is colder (FIG. 8). This ensures smooth engine operating conditions at low engine speed and temperature while optimizing catalytic converter operation and providing fast response at higher speed and temperature. Tighter control can be provided when the engine is in stable, high speed operation, whereas if the valve were opened too quickly at lower speeds engine mis-firing or stalling may occur.

The tabulated values were derived experimentally for a four cylinder vehicle by manual control of the valve operating motor and motor rate controlling potentiometers to determine how fast and how far the valve could be opened under various engine conditions while still ensuring smooth engine operation. The optimum values were then stored in the computer in the form of look-up tables, with speed bands 1 to 6 for engines having a different number of cylinders being derived by theoretical calculations. The system selects which particular set of speed bands are to be used in step 60, according to user selection via the multiple position switch 35 which will be provided on an internal computer control board in the computer.

The tables of values as illustrated in FIGS. 5 to 8 are stored in the computer, along with the speed bands for different engines, and will be looked up by the computer dependent on the detected sensor outputs. After determining the optimum valve open and close rates from the tables, and the maximum valve opening or target valve position from the table of values in FIG. 8, dependent on the detected speed and temperature, in step 68, the computer determines whether the engine speed was decreasing (step 70). If the engine speed is decreasing, the valve is moved to its new position (from the value derived from FIG. 7) as quickly as possible (step 72) and the system returns to step 64 to again detect engine speed and temperature. If the engine speed is the same or increasing from the previously stored values, the oxygen sensor output is sampled (step 74), and the engine operating conditions (temperature, speed, air-fuel ratio) are stored. The system then determines whether the air-fuel ratio is ideal (e.g. around 14.7:1), rich (too much fuel), or lean (too little fuel) in step 75. Typically, the output of the oxygen sensor is a voltage which is proportional to the oxygen concentration, and the system is calibrated to determine the oxygen sensor voltage corresponding to ideal air-fuel ratio conditions. Oxygen sensor output voltages outside a specific narrow range around this ideal voltage will result in determination that the mixture is either too rich or too lean.

If the oxygen sensor output is detected to be in the ideal range, there will be no change in the target valve position (step 76). If the sensor output indicates the mixture is too rich, the computer is set in step 78 to move the valve towards the maximum open position (from the table of values in FIG. 7) at the rate determined in step 68. If the sensor output indicates that the mixture is too lean, the computer is set in step 80 to move the valve towards the fully closed position at the rate determined from the table in FIG. 5 in step 68. At this point the duty cycle is reset to provide a diagnostic or telemetry output at port 43 for maintenance purposes (step 82), as will be explained in more detail below in connection with FIGS. 4A to 4C. The computer then operates the stepper motor to start to move the valve towards its new position, if appropriate (step 84). At this point, the system returns to step 64 and proceeds to update the engine speed and temperature values. The system continues in this closed loop until the engine is turned off. Since the computer operates much faster than the valve actually moves, the target valve position is continuously being updated while the valve is moving.

Figure 4A:
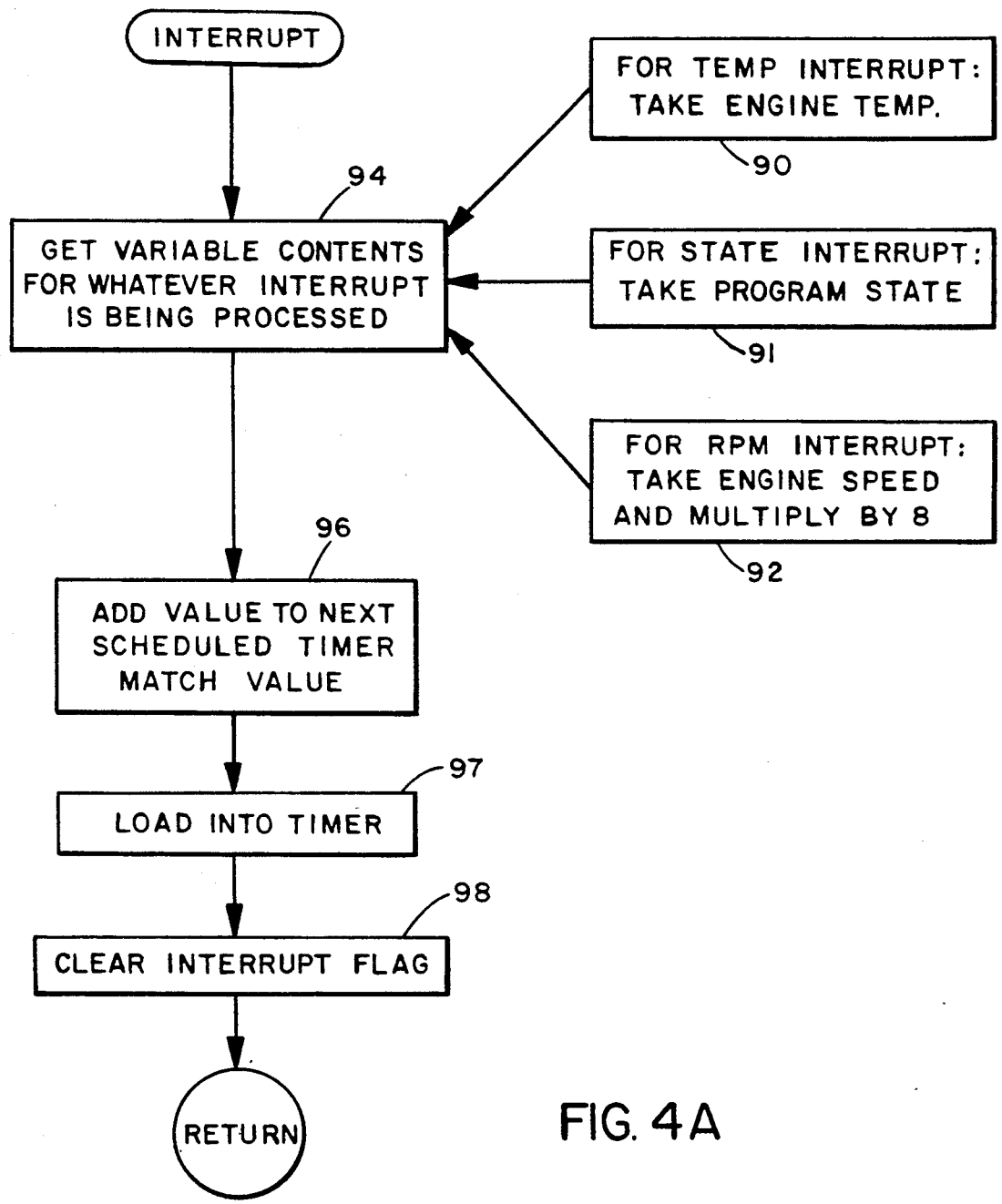
FIGS. 4A to 4C are flow charts illustrating the telemetry functions of the system.
Figure 4B:
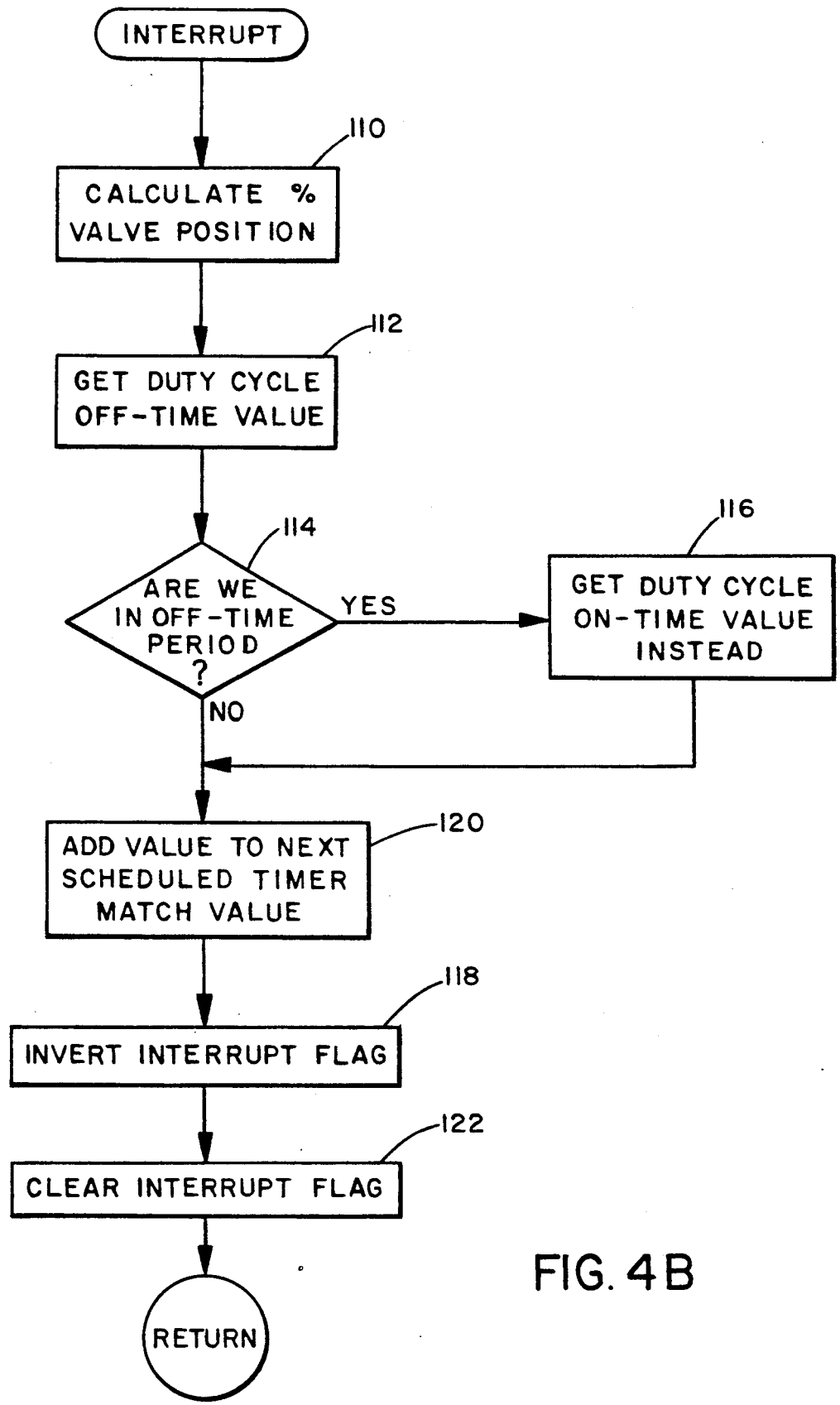
Figure 4C:
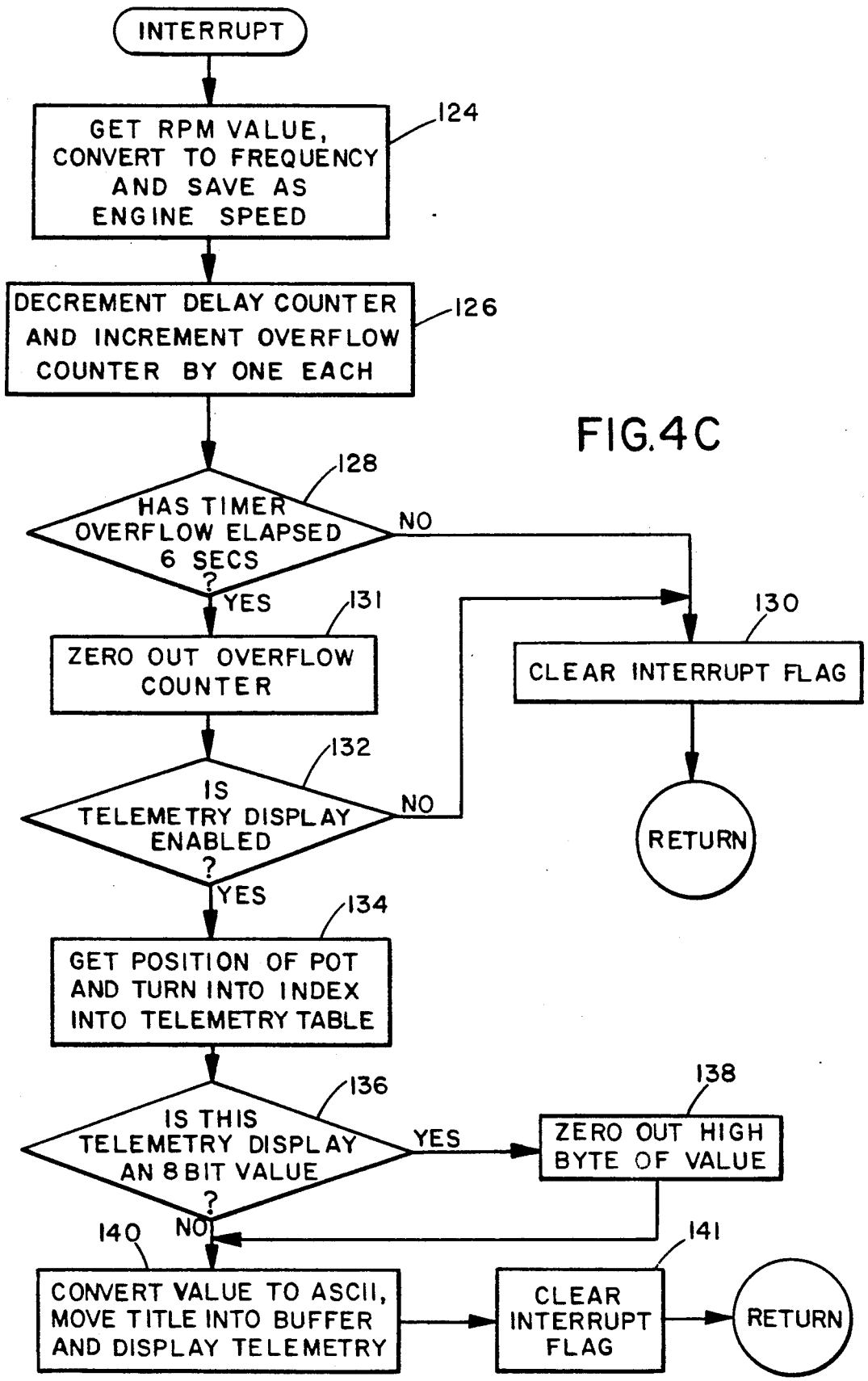

FIGS. 4A to 4C are flow charts illustrating the analog and digital telemetry functions provided in the system programming. FIG. 4A is a flow diagram illustrating the steps for providing analog telemetry values which are sequentially provided at predetermined intervals at the computer output port for selective monitoring by maintenance personnel, for example. The same sequence of steps is provided for output of the engine temperature, program state, and engine speed at different times. These outputs are in the form of square waves for output to an oscilloscope, for example, hooked up to the computer output, with the size of the square wave providing an indication of the engine temperature, speed, and program state, depending on the function being monitored. Thus, the computer is programmed to repeatedly put out an oscilloscope readable signal dependent on the engine temperature, speed and current program state. At each interrupt for each of the variables, the computer takes a reading of the engine temperature (90), program state (91) or engine speed (92) which is output to the serial port in the appropriate format (94). The next three steps 96, 97 and 98 set the program to wait for the next interrupt of that particular variable after a set time interval. Thus, these variables can all be monitored by connecting the output port to an appropriate display unit.

FIG. 4B illustrates the steps for providing an analog duty cycle output which allows the user to determine where the valve is at any instant. In step 110, the computer calculates the valve position as a percentage of how far it has moved towards its target position (on-time) and how far it has left to move (off-time). This will be output in steps 112, 114, 116 as a square wave where the length of the on-time pulse relative to the off-time pulse indicates how far the valve has to move to reach its target position. The computer alternately determines on-time percentage and off-time percentage via the inversion step 118, to successively output on-time and off-time pulses. A tachometer may be hooked up to the output to determine either the position the valve is trying to move to or how far the valve has been moved towards its goal or target position. This can be used as a diagnostic tool, for example to determine why an engine is running roughly. Steps 120, 122 set the computer to the next duty cycle interrupt to return to step 110 after a predetermined interval.

FIG. 4C illustrates the steps for providing a digital telemetry output of various parameters at port 43 at 6 second intervals. In step 124, the engine speed is taken and stored. Step 126 is for setting internal counters used elsewhere in the system. Steps 128, 130 are for determining if 6 seconds has elapsed yet since the last telemetry cycle. If not, the system returns to a waiting mode. If 6 seconds has elapsed, the system zeros out the 6 second counter (131) and determines whether or not the telemetry display has been enabled (step 132). The telemetry display is enabled by the operator via a switch. The system then determines which particular telemetry variable has been selected (134). A dial or potentiometer is provided to allow the operator to select which parameter or variable is to be monitored, and the potentiometer is monitored by the computer at step 134.

The parameters or variables are provided at the output port in digital format, with steps 136, 138 and 140 being used to determine the length of the variable and convert it to the appropriate 8 or 16 bit digital format for output at serial port 43 in step 140. In one preferred embodiment of the invention, the variables provided in the digital telemetry output are the delay time, or delay between program steps, the program state (where in the program the system is at any point), the engine temperature, the RPM band which the engine is currently running at, the current valve position (based on the number of steps moved by the stepper motor), the valve target position, the engine speed, the valve open and close rates, and the six engine speed bands. These are provided in a telemetry display string and any one can be selected for display at any time, with the output port 43 hooked up to a suitable second computer as illustrated in dotted outline in FIG. 1 to display the selected variable. This is a valuable diagnostic tool for use both on initial installation of the system and also for trouble shooting or later maintenance work if the system is not operating properly. By monitoring the program state over time, for example, the operator can determine whether the computer is running in the proper, closed loop fashion and make adjustments if necessary. It can also be used to determine whether various parameters are set correctly for a particular vehicle, allowing some customizing on installation or on subsequent maintenance. The second computer may be any standard portable or even hand held computer. Clearly other selected system variables may be included in the telemetry string if desired. In step 141, the variables are cleared ready for the next interrupt.

This system is simple enough to allow it to be installed relatively easily on existing older vehicles having either no pre-exhausting exhaust emission control, or an older oxidation catalyzer which is less efficient, with little or no modification of the engine itself required. Since the system modulates only the air flow to the engine, rather than the fuel flow, in order to control the air/fuel ratio, it is not necessary to alter the basic fuel metering system of the vehicle. As long as the normal air/fuel ratio of the retro-fitted vehicle is close to stoichiometric, the system is capable of maintaining stoichiometric conditions over a broad range of conditions while ensuring smooth engine running. Installation is sufficiently inexpensive to make it a cost effective option on older vehicles which otherwise would be unable to meet emission standards. If installed on a large number of older vehicles which are still on the road, significant reduction in air pollution is possible.

The computer is additionally capable of producing diagnostic telemetry, both digital and analog, to assist in initial installation of the system as well as to allow testing for proper operation once installed.

Although a preferred embodiment of the invention has been described above by way of example only, it will be understood by those skilled in the field that modifications may be made to the disclosed embodiment without departing from the scope of the invention, which is defined by the appended claims.

We claim:

1. An exhaust emission control system for retro-fitting on existing engines, comprising:
    a catalytic converter for connection in an engine exhaust line;
    an air-fuel ratio detector for connection in the exhaust line for detecting the air-fuel ratio in the exhaust and producing an output signal proportional to the detected air-fuel ratio;
    a supplemental air supply inlet line for connection to an engine intake downstream of the engine throttle valve for supplying supplemental air to the engine;
    a control valve in the supplemental air inlet line for controlling the amount of air supplied to the engine, the valve being moveable between a closed position and predetermined partially open positions;
    valve drive means for moving the control valve between its closed position and selected partially open positions; and
    a controller connected to the air-fuel ratio detector and engine speed detector for controlling operation of the control valve, the controller including means for determining the air-fuel ratio and engine speed at predetermined intervals, the controller having stored look-up tables of valve opening positions dependent on engine speed, and further including means for determining whether the mixture is rich, lean or ideal from the detected air fuel ratio, determining a new valve position from the stored look-up tables according to the detected engine speed if the mixture is too rich, and controlling the valve drive means each time the engine speed and air-fuel ratio is determined to leave the valve in the same position if the mixture is ideal, move the valve towards its closed position if the mixture is too lean, and to move the valve towards the determined new valve position if the mixture is too rich.

2. The system as claimed in claim 1, including means for varying the valve opening and closing rates, the controller having stored look-up tables of valve opening and closing rates according to engine speed, means for determining the valve opening and closing rate from the tables depending on engine speed each time the engine speed is determined, and means for varying the speed of movement of the valve in its opening and closing directions dependent on the determined opening and closing rates, the valve being opened at a faster rate at higher engine speeds.

3. The system as claimed in claim 1, including a temperature sensor for detecting engine temperature, the controller including means for monitoring the temperature sensor output, the stored look-up tables including a series of optimum valve positions dependent on engine speed and temperature, and the controller moving the valve towards a determined new valve position dependent on engine speed and temperature if the mixture is too rich.

4. The system as claimed in claim 1, wherein the controller includes start-up control means for holding the valve in a predetermined position for a predetermined time period after the engine is turned on.

5. The system as claimed in claim 4, wherein the predetermined time period is between 15 and 30 seconds.

6. The system as claimed in claim 4, including an engine temperature sensor, the start-up control means comprising means for determining the engine temperature and holding the valve in a predetermined position for a predetermined time dependent on the engine temperature.

7. The system as claimed in claim 6, wherein the valve is held in its closed position until the engine temperature increases above 50° C.

8. The system as claimed in claim 1, wherein the controller has a selector switch for user selection of the number of engine cylinders, and the look-up tables include tables of optimum valve opening positions dependent on engine speed and engine type, the controller looking up the valve opening position dependent on the selected engine type and speed.

9. The system as claimed in claim 1, wherein the controller includes means for providing a telemetry output of selected system parameters for connection to a monitor.

10. An exhaust emission control system for retro-fitting on an existing vehicle engine, comprising:

a catalytic converter for connection in the engine exhaust line;

an oxygen sensor for connection in the engine exhaust line for detecting the oxygen concentration in the exhaust gases and for producing a corresponding output signal;

a supplemental air inlet for connection to the engine intake downstream of the throttle valve to supply supplemental air to the engine;

a control valve in the supplemental air inlet for controlling the amount of supplemental air supplied to the engine, the control valve being moveable between a closed position and a series of different partially open positions;

a valve driver for moving the control valve between its closed position and any selected partially open position;

an adjustable speed controller for controlling the speed of movement of the valve in both a valve opening and a valve closing direction;

a computer connected to the oxygen sensor and to an engine speed sensor for controlling operation of the valve driver and speed controller dependent on the oxygen concentration and the engine speed, the computer having stored data and program instructions, the stored data including look-up tables of predetermined valve closing rates, valve opening rates, and valve open positions dependent on engine speed, and the program instructions including means for determining the engine speed at predetermined intervals, means for looking up the predetermined valve closing rate, opening rate, and open position at the detected engine speed, means for determining the oxygen concentration and calculating whether the engine is running at a rich, lean or ideal air:fuel ratio, means for moving the valve towards the determined valve open position at the determined valve opening speed if the mixture is too rich, means for moving the valve towards the closed position at the determined valve closing rate if the mixture is too lean, and means for leaving the valve in the same position if the mixture is ideal each time the engine speed and oxygen concentration is determined.

11. The system as claimed in claim 10, wherein the catalytic converter is a dual bed converter including a three way catalytic converter and an oxidation catalyst.

12. A method of controlling engine exhaust emission comprising the steps of:

connecting a catalytic converter and oxygen sensor in the engine exhaust line;

connecting a supplemental air inlet with a control valve for controlling the amount of supplemental air supplied to the engine intake bypassing the engine throttle valve;

connecting a driver to the control valve for moving the valve between its closed position and a series of different open positions;

connecting a computer to the oxygen sensor and engine speed sensor for monitoring the sensor outputs;

storing in the computer at least one look-up table of maximum valve opening as a function of engine speed;

connecting the computer to the valve driver to control opening and closing of the valve;

determining the engine speed at predetermined intervals;

using the detected engine speed to determine the maximum valve opening at that speed;

determining the oxygen level at predetermined intervals;

using the determined oxygen level to determine whether the air-fuel ratio is rich, lean or ideal;

controlling the valve driver to move the valve towards the determined maximum valve opening if the air-fuel ratio is rich; and controlling the valve driver to move the valve towards the closed position if the air-fuel ratio is lean.

13. The method as claimed in claim 12, including the additional steps of:

connecting a speed controller to the valve driver for controlling the speed of opening and closing the valve;

storing in the computer look-up tables of valve opening and closing speeds dependent on engine speed; and using the computer to control the speed controller to open or close the valve at a speed dependent on the detected engine speed when the valve driver is actuated to open or close the valve.

14. The method as claimed in claim 12, including the steps of:

storing in the computer a series of different ranges of engine speed bands dependent on number of engine cylinders;

providing a selector switch for the user to select the number of engine cylinders;

using the computer to select the appropriate range of engine speed bands dependent on the setting of the selector switch.

15. The method as claimed in claim 12, including the additional steps of:

determining whether the engine speed is decreasing each time the engine speed is determined;

moving the valve towards the maximum valve opening for that speed without determining the oxygen level if the engine speed is decreasing; and repeating the engine speed determining and valve moving steps until the engine speed is no longer decreasing.

16. The method as claimed in claim 12, including the additional step of providing a telemetry output of selected system parameters for connection to a monitor.

* * * * *